United States Patent
Numazaki et al.

(10) Patent No.: US 11,698,141 B2
(45) Date of Patent: Jul. 11, 2023

(54) PRESSURE REDUCING VALVE

(71) Applicant: JTEKT CORPORATION, Kariya (JP)

(72) Inventors: Kazushi Numazaki, Toyota (JP); Tetsuya Kaneko, Okazaki (JP); Akira Nakano, Okazaki (JP); Kazuhiro Takabayashi, Okazaki (JP); Kazuo Haneda, Toyota (JP); Yuya Kihara, Nishio (JP)

(73) Assignee: JTEKT CORPORATION, Kariya (JP)

( * ) Notice: Subject to any disclaimer, the term of this patent is extended or adjusted under 35 U.S.C. 154(b) by 59 days.

(21) Appl. No.: 17/456,709

(22) Filed: Nov. 29, 2021

(65) Prior Publication Data
US 2022/0186848 A1 Jun. 16, 2022

(30) Foreign Application Priority Data

Dec. 11, 2020 (JP) .................. 2020-205705

(51) Int. Cl.
*F16K 15/02* (2006.01)
*F16K 15/06* (2006.01)
*F16K 17/08* (2006.01)
*F16K 17/04* (2006.01)
*F16K 27/12* (2006.01)

(52) U.S. Cl.
CPC .......... *F16K 15/025* (2013.01); *F16K 15/063* (2013.01); *F16K 17/0466* (2013.01); *F16K 17/08* (2013.01); *F16K 27/12* (2013.01)

(58) Field of Classification Search
CPC ...... F16K 17/30; F16K 15/025; F16K 15/063; F16K 17/0466; F16K 17/08
See application file for complete search history.

(56) References Cited

U.S. PATENT DOCUMENTS

| 2,645,242 | A | * | 7/1953 | Monnich | ............... | F16K 15/063 |
| | | | | | | 137/538 |
| 8,701,693 | B2 | * | 4/2014 | Shelcoviz | ............... | F16K 1/126 |
| | | | | | | 137/498 |
| 2009/0267014 | A1 | * | 10/2009 | Ishitoya | ................ | F16K 15/025 |
| | | | | | | 251/359 |

FOREIGN PATENT DOCUMENTS

JP 2017-126269 A 7/2017

* cited by examiner

*Primary Examiner* — P. Macade Nichols
(74) *Attorney, Agent, or Firm* — Oblon, McClelland, Maier & Neustadt, L.L.P.

(57) ABSTRACT

A pressure reducing valve includes: a body, a valve seat, and a valve element opening and closing the valve seat according to a difference between a pressure on the inlet side and a pressure on the outlet side. A pressure chamber, which is a space part between the valve element and the valve seat, is provided on the inlet side of the valve element. The valve element includes a plurality of horizontal holes each opening to the pressure chamber, and a vertical hole bringing the horizontal holes and the outlet side of the valve element into communication with each other. The horizontal holes and the vertical hole are provided in such a manner that a value of a ratio of a flow channel area of the vertical hole to a total area that is a total of flow channel areas of the horizontal holes exceeds 1.16.

4 Claims, 2 Drawing Sheets

PRESSURE REDUCING VALVE

CROSS-REFERENCE TO RELATED APPLICATION

This application claims priority to Japanese Patent Application No. 2020-205705 filed on Dec. 11, 2020, incorporated herein by reference in its entirety.

BACKGROUND

1. Technical Field

The disclosure relates to a pressure reducing valve.

2. Description of Related Art

As described in, for example, Japanese Unexamined Patent Application Publication No. 2017-126269 (JP 2017-126269 A), there are pressure reducing valves that reduce a pressure of a gas supplied from an inlet port and delivers the pressure-reduced gas to an outlet port. The pressure reducing valves each include a body, a valve seat, a valve element, and a biasing member. Inside the body, a flow channel that brings the inlet port and the outlet port into communication with each other is provided. The valve seat is provided in the flow channel. The valve element is provided in such a manner as to be capable of coming into contact with and moving away from the valve seat. The biasing member biases the valve element in a direction in which the valve element moves away from the valve seat. The valve element moves according to a differential pressure between a pressure on the inlet port side and a pressure on the outlet port side and a biasing force of the biasing member. The outlet pressure is adjusted by an aperture of the pressure reducing valve varying according to the position of the valve element.

SUMMARY

In the pressure reducing valve of JP 2017-126269 A, there is the following concern. For example, in a state in which the pressure reducing valve is open, when a gas rapidly enters from the inlet port, the pressure on the inlet port of the valve element rapidly rises. Therefore, the difference between the pressure on the inlet port side and the pressure on the outlet port of the valve element becomes larger, which may cause a delay in valve closing operation of the valve element. There is a concern that the delay in valve closing operation causes the outlet pressure to exceed a set value for the pressure.

The disclosure provides a pressure reducing valve capable of more properly adjusting a pressure of a gas.

A pressure reducing valve according to an aspect of the disclosure includes: a body including a gas flow channel; a valve seat provided in the gas flow channel; and a valve element provided downstream of the valve seat in the gas flow channel and consistently biased in a direction in which the valve element moves away from the valve seat, the valve element opening and closing the valve seat according to a difference between a pressure on the inlet side and a pressure on the outlet side. A pressure chamber, which is a space part between the valve element and the valve seat, is provided on the inlet side of the valve element in the gas flow channel. The valve element includes a plurality of horizontal holes each extending along a direction in which the horizontal hole intersects with an axis of the valve element at a position close to the valve seat in the valve element and opening to the pressure chamber, and a vertical hole extending along the axis of the valve element and bringing the horizontal holes and the outlet side of the valve element in the gas flow channel into communication with each other. The horizontal holes and the vertical hole are provided in such a manner that a value of a ratio of a flow channel area of the vertical hole to a total area that is a total of flow channel areas of the horizontal holes exceeds 1.16.

According to this aspect, the flow channel area of the vertical hole is set to a value that is larger relative to the area that is a total of the flow channel areas of the horizontal holes. Therefore, a gas flowing from the pressure chamber into the vertical hole via the horizontal holes more smoothly flows to the outlet side of the valve element in the gas flow channel. Consequently, even if a large amount of gas is rapidly supplied to the pressure chamber, a rapid rise in pressure in the pressure chamber can be curbed. Since a difference is less likely to occur between the pressure in the pressure chamber on the inlet side of the valve element and the pressure on the outlet side of the valve element, the valve element performs a valve closing operation at a more proper timing along with a rise in pressure on the outlet side of the valve element. Therefore, it is possible to more properly adjust the pressure of the gas to be supplied to the outlet side of the valve element.

In the above aspect, respective inner diameters of the horizontal holes may be all set to the same value. In the above aspect, the horizontal holes may be provided at a regular interval in a circumferential direction of the valve element.

These configurations allow the gas inside the pressure chamber to more evenly and smoothly flow into the horizontal holes and flow to the outlet side of the valve element in the gas flow channel via the vertical hole in a favorable manner.

The above aspect enables more properly adjusting a pressure of a gas.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
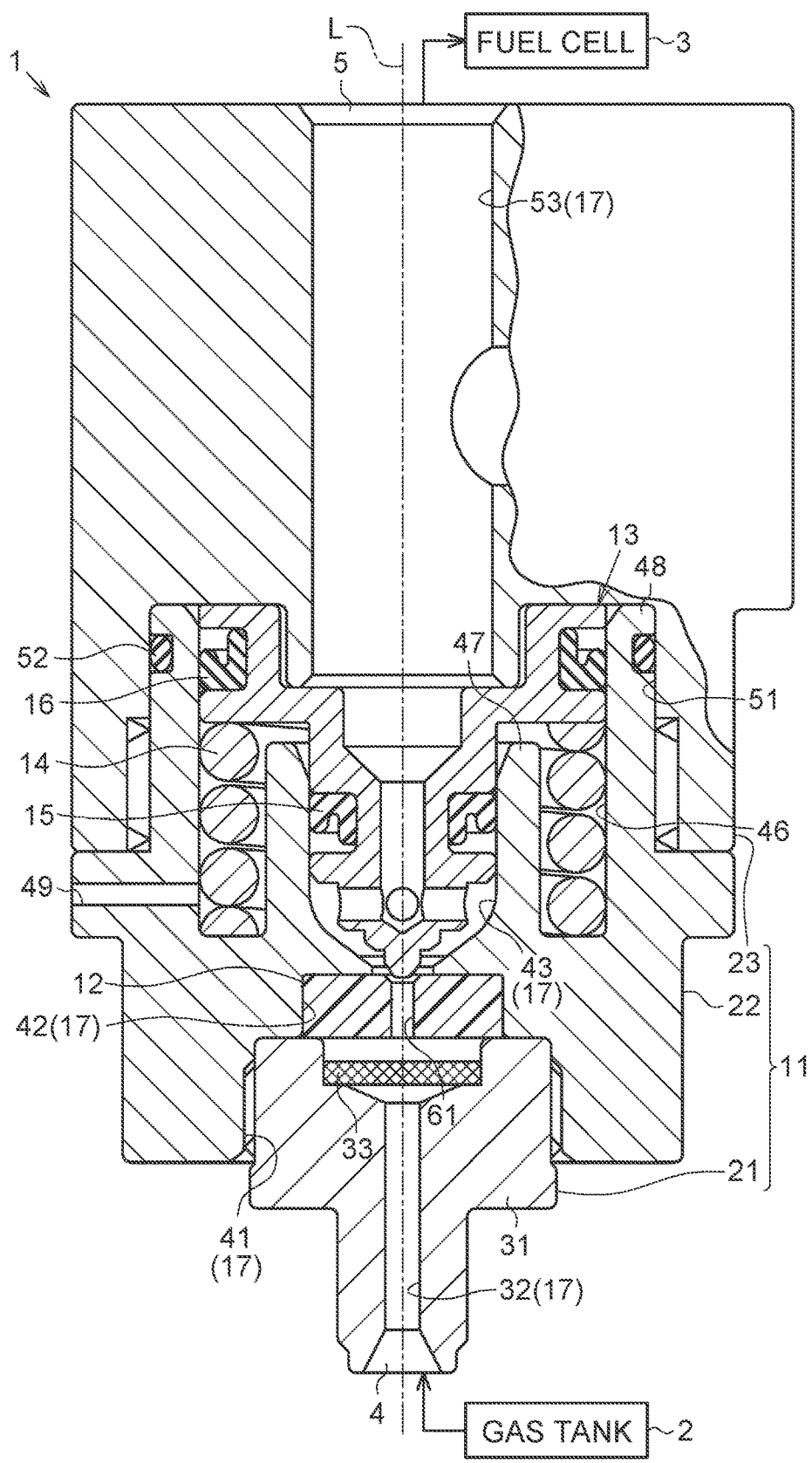
FIG. 1 is a sectional view of an embodiment of a pressure reducing valve cut along an axis thereof.

An embodiment of a pressure reducing valve will be described below. As illustrated in FIG. 1, as an example, a pressure reducing valve 1 is provided in a fluid circuit connecting a gas tank 2 of hydrogen gas and a fuel cell 3 mounted in a fuel-cell vehicle. The pressure reducing valve 1 reduces an inlet pressure, which is a pressure of the hydrogen gas supplied from the gas tank 2 via an inlet port 4, to a pressure that is equal to or below a set pressure, and supplies the pressure-reduced gas to the fuel cell 3 via an outlet port 5. The inlet pressure of the gas supplied from the inlet port 4 is, for example, a high pressure of around 87.5

MPa. The set pressure, which is a target value for an outlet pressure that is a pressure reduced by the pressure reducing valve 1 is, for example, around 1.2 MPa.

The pressure reducing valve 1 includes a body 11, a valve seat 12, a valve element 13, a biasing member 14, a first sealing member 15, and a second sealing member 16. The body 11 includes a gas flow channel 17 that brings the inlet port 4 and the outlet port 5 into communication with each other, a high-pressure gas flowing in the gas flow channel 17. The valve seat 12 is disposed in the gas flow channel 17. The valve element 13 is disposed downstream of the valve seat 12 in the gas flow channel 17. The biasing member 14 biases the valve element 13 in a direction in which the valve element 13 moves away from the valve seat 12. The first sealing member 15 and the second sealing member 16 are each attached to an outer circumferential surface of the valve element 13. The valve element 13 comes into contact with and moves away from the valve seat 12 according to a differential pressure between the inlet pressure and the outlet pressure and a biasing force of the biasing member 14. The outlet pressure is adjusted to a pressure that is equal to or below a set value by an aperture of the pressure reducing valve 1 varying according to the position of the valve element 13.

The body 11 includes a joint member 21, a first housing member 22, and a second housing member 23. The joint member 21, the first housing member 22, and the second housing member 23 are each made of a metal. The body 11 is assembled by joining the joint member 21, the first housing member 22, and the second housing member 23 in the order mentioned from the upstream side in a direction in which the hydrogen gas flows. In the assembled body 11, the joint member 21, the first housing member 22, and the second housing member 23 are disposed on a common axis L.

The joint member 21 has a substantially stepped columnar shape. An outer circumferential surface of a large-diameter portion 31 of the joint member 21 includes a male thread. The joint member 21 includes a joint flow channel 32 that is a part of the gas flow channel 17. The joint flow channel 32 extends linearly along the axis L and opens at opposite ends of the joint member 21. The opening on the upstream side of the joint flow channel 32 functions as the inlet port 4. The joint member 21 includes a filter 33. The filter 33 is provided in the opening on the downstream side of the joint flow channel 32.

The first housing member 22 has a substantially columnar shape. The first housing member 22 has an outer diameter that is larger than that of the joint member 21. The first housing member 22 includes a first mounting hole 41 and a second mounting hole 42, which form parts of the gas flow channel 17. The first mounting hole 41 and the second mounting hole 42 each have a round hole shape. The first mounting hole 41 opens in an end surface on the upstream side of the first housing member 22. The second mounting hole 42 is continuous with the downstream side of the first mounting hole 41. The first mounting hole 41 and the second mounting hole 42 are each provided on the same axis L. An inner circumferential surface of the first mounting hole 41 includes a female thread. The joint member 21 is joined to the first housing member 22 by the large-diameter portion 31 being fastened to the first mounting hole 41. The second mounting hole 42 has an inner diameter that is smaller than that of the first mounting hole 41. The valve seat 12 is mounted in the second mounting hole 42. In other words, the valve seat 12 is provided in the gas flow channel 17.

The first housing member 22 includes a receiving hole 43 that is a part of the gas flow channel 17. The receiving hole 43 has a substantially round hole shape. The receiving hole 43 communicates with the second mounting hole 42 and opens in an end surface on the downstream side of the first housing member 22. The receiving hole 43 is provided on the axis L. The first housing member 22 includes a partition wall 44 that separates the receiving hole 43 and the second mounting hole 42 from each other. The partition wall 44 is provided in such a manner as to have an annular shape as viewed in a direction along the axis L. The partition wall 44 is provided in such a manner that an inner diameter in a part on the upstream side of the receiving hole 43 gradually decreases toward the upstream side. A part of the valve element 13 is received inside the receiving hole 43. In other words, the valve element 13 is provided downstream of the valve seat 12 in the gas flow channel 17.

The first housing member 22 includes an annular installing groove 46. The installing groove 46 is positioned on the outer circumferential side of the receiving hole 43. Like the receiving hole 43, the installing groove 46 opens to the downstream side of the first housing member 22. The installing groove 46 is provided as a gap between a cylindrical inner wall 47 and a cylindrical outer wall 48 provided at the first housing member 22. The inner wall 47 defines an inner edge of the installing groove 46. The outer wall 48 defines an outer edge of the installing groove 46. The outer wall 48 projects downstream of the inner wall 47. An outer circumferential surface of the outer wall 48 configures a part of an outer circumferential surface of the first housing member 22. A male thread is provided at the outer circumferential surface of the outer wall 48. The male thread is provided at a position corresponding to that of the installing groove 46. Note that the first housing member 22 includes a communication channel 49 that brings the inside of the installing groove 46 and the outside of the body 11 into communication with each other.

The second housing member 23 has a substantially columnar shape. The second housing member 23 has an outer diameter that is slightly larger than that of the first housing member 22. The second housing member 23 includes a connecting hole 51. The connecting hole 51 opens in an end surface on the upstream side of the second housing member 23. The connecting hole 51 has a round hole shape. A female thread is provided at an inner circumferential surface of the connecting hole 51. The female thread is located at a position close to an open end of the connecting hole 51. The first housing member 22 is joined to the second housing member 23 by the outer wall 48 being inserted and fastened to the connecting hole 51. Note that a third sealing member 52, for example, an O-ring, is fitted on the outer circumferential surface of the outer wall 48.

Also, the second housing member 23 includes a housing flow channel 53 that is a part of the gas flow channel 17. The housing flow channel 53 extends linearly along the axis L. The housing flow channel 53 includes an upstream-side opening in a bottom surface of the connecting hole 51, and a downstream-side opening in an end surface on the downstream side of the second housing member 23. The opening on the downstream side of the housing flow channel 53 functions as the outlet port 5.

The valve seat 12 is made of a resin. The valve seat 12 has an annular shape. The valve seat 12 is disposed in the second mounting hole 42 of the first housing member 22. Then, the valve seat 12 is pushed against a bottom surface of the second mounting hole 42 by the joint member 21 mounted in the first mounting hole 41. The valve seat 12 includes a valve hole 61. The valve hole 61 extends linearly along the axis L and opens in opposite end surfaces on the axis L of the valve seat 12. In an area on the downstream side of the valve hole 61, an inner circumferential surface of the valve hole 61 is inclined in such a manner that an inner diameter increases toward the downstream side.

Figure 2:
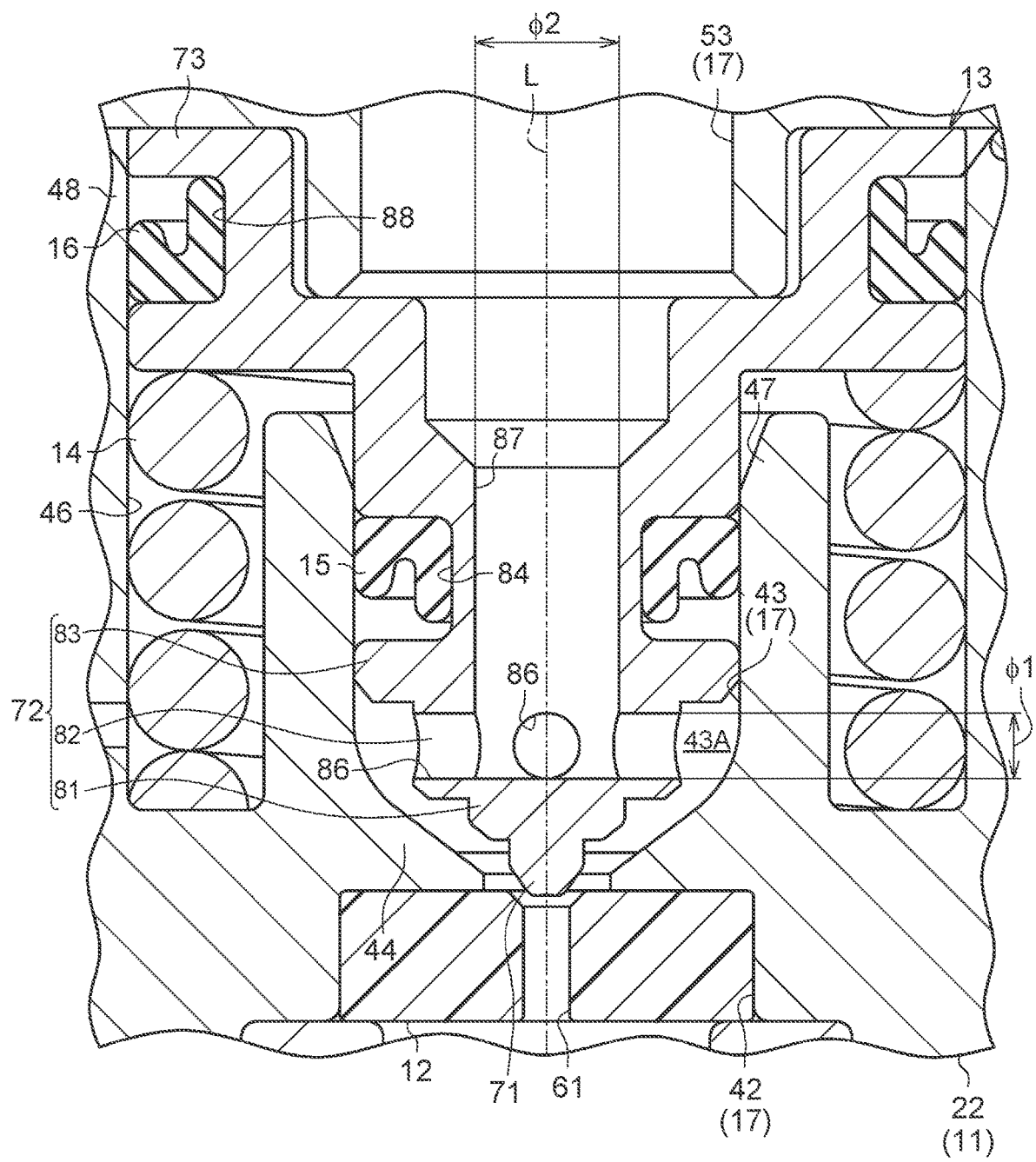
FIG. 2 is an enlarged sectional view of an area in the vicinity of a valve element and a valve seat in an embodiment.

The valve element 13 is made of a metal. As illustrated in FIG. 2, the valve element 13 includes a head portion 71, a body portion 72, and a pressure receiving portion 73. The head portion 71, the body portion 72, and the pressure receiving portion 73 are formed in an integrated manner in the order mentioned from the upstream side. The head portion 71 and the body portion 72 are received in the receiving hole 43 of the first housing member 22. The pressure receiving portion 73 projects to the downstream side from the inner wall 47 and is received inside the outer wall 48. The valve element 13 is movable along the axis L inside the body 11. Also, the valve element 13 is capable of coming into contact with and moving away from the valve seat 12.

The head portion 71 has a substantially columnar shape. The head portion 71 has a tapered shape tapering toward the distal end side, that is, the upstream side. The tapered shape of the head portion 71 inclines in such a manner as to correspond to the inclination on the area on the downstream side of the valve hole 61.

The body portion 72 has a substantially stepped columnar shape. The body portion 72 includes a distal end portion 81, an intermediate portion 82, and a proximal end portion 83. The distal end portion 81, the intermediate portion 82, and the proximal end portion 83 are formed in an integrated manner in the order mentioned from the upstream side. The head portion 71 is provided at an end surface on the upstream side of the distal end portion 81. A value of an outer diameter of the body portion 72 is set in such a manner as to be larger in the order of the distal end portion 81, the intermediate portion 82, and the proximal end portion 83. An outer circumferential surface of the proximal end portion 83 includes a first fitting groove 84. The first fitting groove 84 is provided in an annular shape extending over an entire circumference of the proximal end portion 83.

The outer diameter of the distal end portion 81 is smaller than an inner diameter of the partition wall 44 of the first housing member 22 and a gap between the distal end portion 81 and the partition wall 44 functions as a part of the gas flow channel 17. The outer diameter of the intermediate portion 82 is larger than the outer diameter of the distal end portion 81. The outer diameter of the proximal end portion 83 is slightly smaller than an inner diameter of the receiving hole 43. The outer circumferential surface of the proximal end portion 83 is slidable relative to an inner circumferential surface of the receiving hole 43.

Also, the body portion 72 includes a plurality of (for example, four) horizontal holes 86 and one vertical hole 87. Each horizontal hole 86 extends linearly along a direction orthogonal to the axis L. Each horizontal hole 86 opens in an outer circumferential surface of the intermediate portion 82. The horizontal holes 86 are provided equiangularly in a circumferential direction of the body portion 72. The vertical hole 87 extends linearly along the axis L. The vertical hole 87 opens in an end surface on the opposite side of the body portion 72 from the head portion 71. In other words, an end portion on the downstream side of the vertical hole 87 opens to the downstream side (outlet side) of the valve element 13 in the gas flow channel 17. An end portion on the upstream side of the vertical hole 87 communicates with each of the horizontal holes 86. The horizontal holes 86 and the vertical hole 87 configure a valve element flow channel.

The pressure receiving portion 73 has a substantially stepped annular shape. The pressure receiving portion 73 extends radially outward from an end portion on the downstream side of the body portion 72. The pressure receiving portion 73 has an outer diameter that is slight smaller than an inner diameter of the outer wall 48 of the first housing member 22. An outer circumferential surface of the pressure receiving portion 73 is slidable relative to an inner circumferential surface of the outer wall 48. A thickness in the direction along the axis L of the pressure receiving portion 73 is larger in a radially outer part than in a radially inner part. The outer circumferential surface of the pressure receiving portion 73 includes a second fitting groove 88. The second fitting groove 88 is provided in an annular shape extending over an entire circumference of the pressure receiving portion 73.

For the biasing member 14, for example, a helical compression spring is employed. The biasing member 14 is received in the installing groove 46. The biasing member 14 is compressed along the axis L between a bottom surface of the installing groove 46 and the pressure receiving portion 73 of the valve element 13 in the installing groove 46. The biasing member 14 biases the valve element 13 in a valve opening direction in which the valve element 13 moves away from the valve seat 12, that is, toward the downstream side in the direction in which the hydrogen gas flows.

For each of the first sealing member 15 and the second sealing member 16, a lip seal is employed. The first sealing member 15 is fitted in the first fitting groove 84 and the second sealing member 16 is fitted in the second fitting groove 88. The first sealing member 15 provides sealing between an outer circumferential surface of the body portion 72 and the inner circumferential surface of the receiving hole 43. The second sealing member 16 provides sealing between the outer circumferential surface of the pressure receiving portion 73 and the inner circumferential surface of the outer wall 48. Consequently, release of the pressure-reduced hydrogen gas to the outside via the installing groove 46 and the communication channel 49 is curbed.

Next, operation of the pressure reducing valve 1 will be described. In an initial state before supply of high-pressure hydrogen gas from the inlet port 4, the valve element 13 is maintained in a state of being moved to the downstream side by a biasing force of the biasing member 14. In other words, the pressure reducing valve 1 is maintained in a valve opening state in which the valve element 13 is away from the valve seat 12.

The hydrogen gas having an inlet pressure, which is supplied from the inlet port 4, passes through the joint flow channel 32, which is included in the gas flow channel 17, and flows into the receiving hole 43 via the valve hole 61 and the head portion 71 of the valve element 13. When the hydrogen gas passes through a gap between the valve hole 61 and the head portion 71, the pressure of the hydrogen gas is reduced according to a size of the gap. The pressure-reduced hydrogen gas flows into the housing flow channel 53 included in the gas flow channel 17 via the horizontal holes 86 and the vertical hole 87 and is delivered from the outlet port 5. As a result of an increase in amount of hydrogen gas flowing in via the valve hole 61 in this way, an outlet pressure rises.

The valve element 13 is biased in the valve opening direction, which is a direction toward the downstream side, by the biasing force of the biasing member 14 and a biasing force corresponding to the inlet pressure received by the head portion 71 via the valve hole 61. On the other hand, the valve element 13 is biased in a valve closing direction, which is a direction toward the upstream side, by a biasing force corresponding to an outlet pressure received mainly by the pressure receiving portion 73. The valve element 13 moves according to a relationship in magnitude between the biasing force toward the upstream side and the biasing force toward the downstream side.

The valve element 13 moves close to the valve seat 12 according to a rise in outlet pressure, and upon the outlet pressure reaching the set pressure, the valve element 13 is seated on the valve seat 12. In other words, the pressure reducing valve 1 is closed. Subsequently, upon the outlet pressure dropping because of the hydrogen gas being consumed in the fuel cell 3, the valve element 13 moves toward the downstream side along with the outlet pressure drop. Then, upon the pressure reducing valve 1 being finally opened again, the hydrogen gas flows in from the inlet port 4. As a result of the valve element 13 moving according to a differential pressure between the inlet pressure and the outlet pressure in this way, the hydrogen gas adjusted to have the set pressure is supplied from the pressure reducing valve 1 to the fuel cell 3.

There is the following concern in the pressure reducing valve 1 configured as above. For example, in a state in which the pressure reducing valve 1 is open, when a large amount of hydrogen gas rapidly flows in from the inlet port 4, it is conceivable that a pressure on the inlet port 4 side of the valve element 13, more specifically, a pressure in a pressure chamber 43A, which is a space part on the upstream side (inlet side) relative to the proximal end portion 83 in the receiving hole 43, rapidly rises. In this case, an increase in difference between the pressure on the inlet port 4 side and the pressure on the outlet port 5 side of the valve element 13 may cause a delay in valve closing operation of the valve element 13. There is a concern that the delay in valve closing operation of the valve element 13 causes the outlet pressure to exceed a value of the set pressure.

Therefore, in the present embodiment, the following configuration is employed for the valve element 13. In other words, an inner diameter of the vertical hole 87 and an inner diameter of each horizontal hole 86 are set in such a manner that a value of a ratio of a flow channel area of the vertical hole 87 to a total area that is a total of flow channel areas of the horizontal holes 86 meets Expression (1) below.

$$S2/S1 \cdot N = \pi(\varphi2/2)^2/\pi(\varphi1/2)^2 \cdot N > 1.16 \quad (1)$$

Where "S2" is the flow channel area of the vertical hole 87 and "S1" is the flow channel area of each horizontal hole 86. "N" is the count of openings of the horizontal holes 86 in the pressure chamber 43A. "φ2" is the inner diameter of the vertical hole 87 and the "φ1" is the inner diameter of each horizontal hole 86. The "π" is the circumference ratio.

For example, where the opening count N of the horizontal holes 86 is "4", the inner diameter φ2 of the vertical hole 87 is set to "6.5 mm" and the inner diameter φ1 of the horizontal hole 86 is set to "3.0 mm". In this case, a value of a ratio of the flow channel area S2 of the vertical hole 87 to a total area that is a total of the flow channel areas S1 of the horizontal holes 86 is approximately "1.17" and thus meets Expression (1). As a result of a simulation, the pressure in the pressure chamber 43A, which is the inlet side of the valve element 13, is "1.6 MPa" and the pressure on the outlet side of the valve element 13 is "1.5 MPa", and thus, it has been confirmed that no significant pressure difference occurs.

In addition, where the opening count N of the horizontal holes 86 is "4", if the inner diameter φ2 of the vertical hole 87 is set to "3.5 mm" and the inner diameter φ1 of each horizontal hole 86 is set to "1.7 mm", a value of a ratio of the flow channel area S2 of the vertical hole 87 to a total area that is a total of the flow channel areas S1 of the horizontal holes 86 is approximately "1.06" and thus does not meet Expression (1). As a result of a simulation, the pressure in the pressure chamber 43A, which is the inlet side of the valve element 13, is "3.2 MPa" and the pressure on the outlet side of the valve element 13 is "1.5 MPa", and thus, it has been confirmed that a pressure difference occurs.

Employment of the above configuration provides the following operation and effects. In a state in which the pressure reducing valve 1 is open, the hydrogen gas supplied from the inlet port 4 flows into the inside of the receiving hole 43, more specifically, the pressure chamber 43A, which is a space part on the upstream side relative to the proximal end portion 83 in the receiving hole 43, via the valve seat 12 and the head portion 71 of the valve element 13. The hydrogen gas flowing into the inside of the receiving hole 43 flows into the inside of the vertical hole 87 via the horizontal holes 86.

Here, the vertical hole 87 and the horizontal holes 86 are provided in such a manner that a value of a ratio of the flow channel area of the vertical hole 87 to an area that is a total of the flow channel areas of the horizontal holes 86 becomes larger. In other words, the flow channel area of the vertical hole 87 is set to a value that is larger relative to the area that is a total of the flow channel areas of the horizontal holes 86. Therefore, the hydrogen gas flowing from the pressure chamber 43A into the vertical hole 87 from the respective horizontal holes 86 more smoothly flows to the outlet side of the valve element 13 in the gas flow channel 17. Consequently, even if a large amount of hydrogen gas rapidly flows in from the inlet port 4 in a state in which the pressure reducing valve 1 is open, a rapid rise in pressure in the pressure chamber 43A can be curbed. Since a difference is less likely to occur between the pressure in the pressure chamber 43A and the pressure on the outlet port 5 side of the valve element 13, the valve element 13 starts a valve closing operation at a more proper timing along with a rise in pressure on the outlet port 5 side of the valve element 13. Therefore, for example, the pressure on the outlet port 5 side of the valve element 13 exceeding the set pressure is curbed. In this way, the pressure reducing valve 1 enables more properly adjusting pressure of hydrogen gas.

Other Embodiments

The present embodiment may be altered as follows. Although in the present embodiment, a helical compressing spring is used for the biasing member 14, the disclosure is not limited to this example, and, for example, another elastic member, such as a disc spring, may be employed.

Although in the present embodiment, the inner diameters φ1 of the horizontal holes 86 all have the same value, the horizontal holes 86 may include a horizontal hole 86 having a different inner diameter. Although in the present embodiment, the horizontal holes 86 are provided at a regular interval in the circumferential direction of the valve element 13, the horizontal holes 86 may be provide at an irregular interval.

Although in the present embodiment, the pressure reducing valve 1 is used for the purpose of reducing a pressure of high-pressure hydrogen gas, the disclosure is not limited to this example, but the pressure reducing valve 1 may be used for the purpose of reducing a pressure of a high-pressure gas other than hydrogen.

What is claimed is:

1. A pressure reducing valve comprising:
   a body including a gas flow channel;
   a valve seat provided in the gas flow channel; and
   a valve element provided downstream of the valve seat in the gas flow channel and consistently biased in a direction in which the valve element moves away from the valve seat, the valve element opening and closing the valve seat according to a difference between a pressure on an inlet side and a pressure on an outlet side, wherein
   a pressure chamber, which is a space part between the valve element and the valve seat, is provided on the inlet side of the valve element in the gas flow channel,
   the valve element includes a plurality of horizontal holes each extending along a direction in which the horizontal hole intersects with an axis of the valve element at a position close to the valve seat in the valve element and opening to the pressure chamber, and a vertical hole extending along the axis of the valve element and bringing the horizontal holes and the outlet side of the valve element in the gas flow channel into communication with each other, and
   the horizontal holes and the vertical hole are provided in such a manner that a value of a ratio of a flow channel area of the vertical hole to a total area that is a total of flow channel areas of the horizontal holes exceeds 1.16.

2. The pressure reducing valve according to claim 1, wherein respective inner diameters of the horizontal holes are all set to the same value.

3. The pressure reducing valve according to claim 2, wherein the horizontal holes are provided at a regular interval in a circumferential direction of the valve element.

4. The pressure reducing valve according to claim 1, wherein the horizontal holes are provided at a regular interval in a circumferential direction of the valve element.

* * * * *